Jan. 11, 1955  G. A. LYON  2,698,989
METHOD OF MAKING A BRAKE DRUM AIR-COOLING DEVICE
Filed Aug. 13, 1949  2 Sheets-Sheet 1
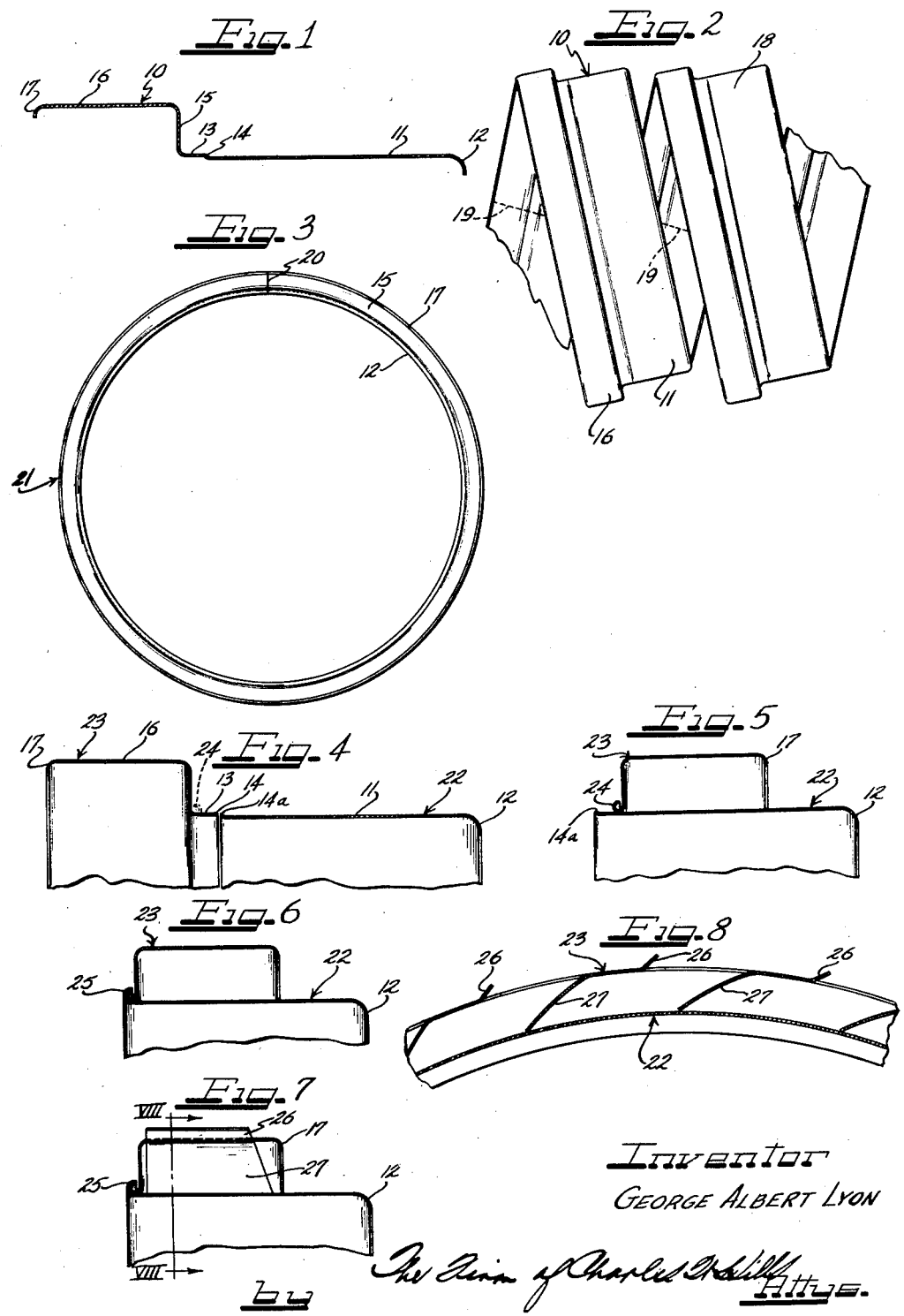
Inventor
GEORGE ALBERT LYON Jan. 11, 1955  G. A. LYON  2,698,989
METHOD OF MAKING A BRAKE DRUM AIR-COOLING DEVICE
Filed Aug. 13, 1949  2 Sheets-Sheet 2
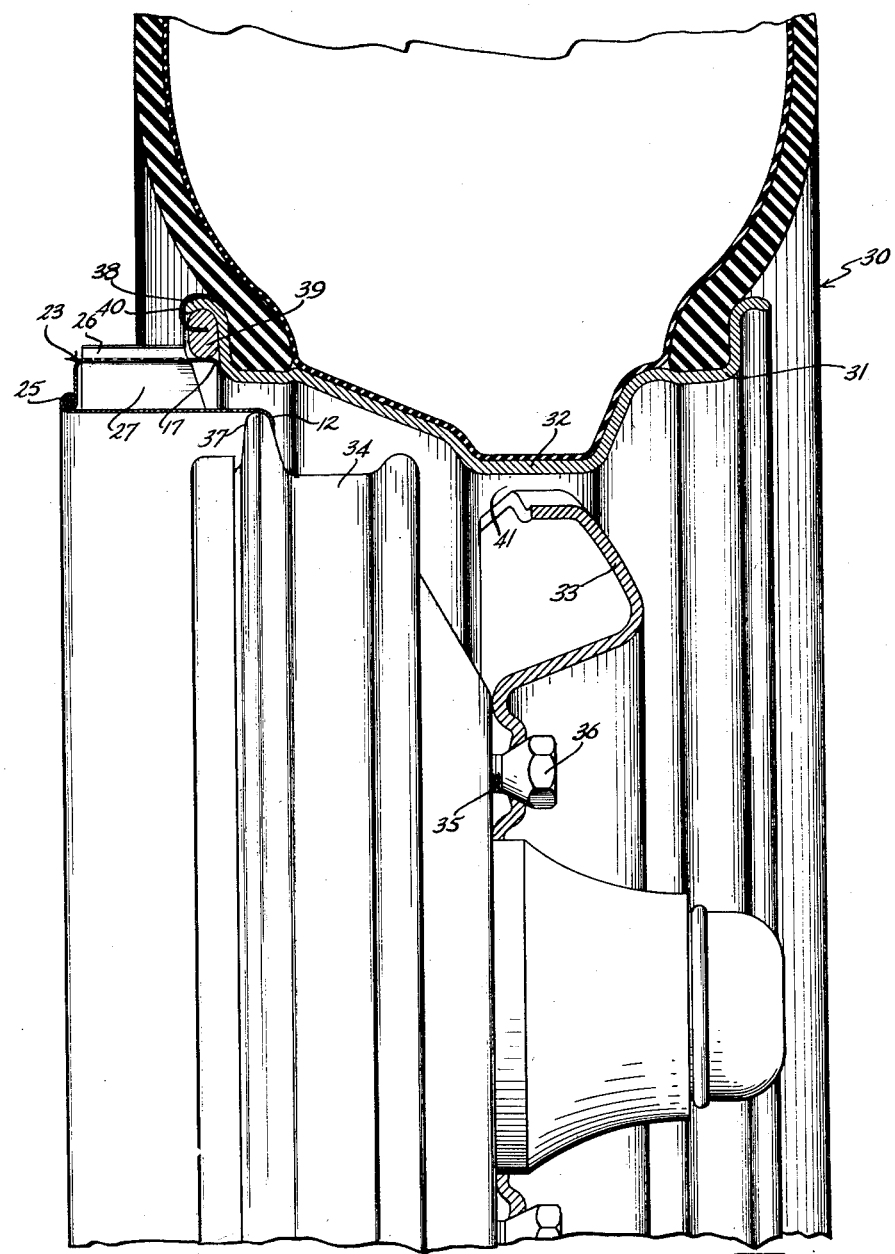
Inventor
GEORGE ALBERT LYON 2,698,989
Patented Jan. 11, 1955

2,698,989

METHOD OF MAKING A BRAKE DRUM AIR-COOLING DEVICE

George Albert Lyon, Detroit, Mich.

Application August 13, 1949, Serial No. 110,092

4 Claims. (Cl. 29—152.2)

The present invention relates to a method of making objects having concentric ring structures and in particular to a method of making a brake drum cooling device for insertion into a conventional wheel structure for the purpose of promoting cooling of brake drums by directing a passage of air over the brake drum.

An object of the present invention is to provide a method of making a concentric ring structure in an efficient and economical manner.

Another object of the invention is to provide a method for manufacturing a brake drum cooling device or the like from material such as sheet metal or other sheet material.

A further object of the invention is to provide a method for manufacturing a brake drum cooling device having a plurality of air collecting passages which serve to direct the flow of air around surfaces of the object to be cooled and to thereby dissipate the heat inherently generated in the brake drum.

In general, the invention comprises rolling or otherwise forming of a piece of sheet metal into an annular configuration containing a plurality of different diameters, while at the same time drawing the materials from the rolling operation in the form of a helix. Sections of the thus formed helix are next cut to appropriate lengths and the ends thereof are secured together to form a ring having a plurality of sections of different diameters. Next, the ring structure thus produced is severed at an appropriate point, to produce two rings of different diameters. These rings are then securely joined at their peripheries, and thereafter the air collecting passages are provided within the dual ring structure to serve as means for directing air along the surfaces of the brake drum or other surface to be cooled.

A further description of the present invention will be made in connection with the attached sheets of drawings in which:

Figure 1 is a cross-sectional view of the sheet metal strip after leaving the rolling operation;

Figure 2 illustrates the helical form of the strip as it leaves the rolling operation;

Figure 3 is a plan view of the strip after joining the respective end portions;

Figure 4 is an enlarged fragmentary sectional view of the ring illustrating the manner in which the ring is severed;

Figure 5 is a view similar to Figure 4 illustrating the method of disposing the severed ring in overlying relationship with the remaining ring;

Figure 6 is a view similar to Figure 5 illustrating the method of securing the outer to the inner concentric ring;

Figure 7 is a fragmentary sectional view of the completed assembly with the air collecting passages formed therein;

Figure 8 is a cross-sectional view taken along line VIII—VIII of Figure 7; and

Figure 9 is a fragmentary view partly in section and partly in elevation of a brake drum cooling device prepared according to the method of the present invention and installed within a conventional wheel structure.

As shown on the drawings:

As a preliminary step in the method of the present invention, a strip 10 of resilient sheet material which may be metal, plastic or other resilient material, is rolled into the configuration shown in Figure 1. This configuration, considered in cross-section, includes a relatively wide, substantially straight portion 11 terminating at its free edge in a radially inwardly turned marginal flange 12. A relatively short stepped area 13 is joined to the opposite margin of the straight portion 11 through a crimp 14. A radially outwardly extending wall or flange portion 15 projects from the step 13; and another substantially straight portion 16 narrower than the portion 11 beyond said wall flange 15 and terminates at its opposite edge in a short radially inwardly turned marginal flange 17.

As is best seen in Figure 2, the strip 10 when withdrawn from the rolling operation is in the form of a continuous helix 18 to facilitate production of the ring members. The continuous helix 18 is next cut clear across the strip at predetermined regular intervals in a direction perpendicular to the strip 10, as indicated by the dotted lines 19 of Figure 2. The opposite ends of each section thus produced are brought into abutting relationship and joined as by means of a butt weld 20 to form a solid ring 21. It will be observed that the ring 21 has substantially cylindrical surfaces of three different diameters, the smallest diameter corresponding to the inner diameter required in the finished ring and formed from the wide surface 11, a surface formed with a very slightly larger diameter from the intermediate step area 13, and a surface having a relatively large diameter formed from the portion 16 of the strip 10.

After the production of the individual rings 21, each ring is severed along the crimp 14 (Fig. 4) to produce two separate ring sections comprising a ring 22 having a severed edge 14a, and a second ring 23 of larger outside and inside diameters.

Next, the intermediate step and now flange portion 13 is provided with a rolled edge 24 as shown in dotted lines in Figure 4. Following the rolling of the edge 24, the separate ring sections are relatively reversed and the larger diameter ring 23 is slipped onto the ring 22 axially past the flanged edge 12 thereof until the rolled edge 24 is adjacent the severed edge 14a and the rings lie in concentrically telescoped relation. The two concentric rings so formed and assembled are joined at their peripheries by rolling the edge 14a of the smaller diameter ring 22 over the pre-formed rolled edge 24 on the ring 23, thus providing a rolled joint 25 around the common periphery of the outer ring 23 and the inner ring 22 and permanently uniting the rings into a hollow ring structure of generally U-shape cross-section opening toward one side, with the radially inner ring 22 projecting axially beyond the flange 17 of the outer ring 23.

The composite ring structure as shown in Figure 6 is next provided with air collecting passages, as by forming raised vanes 26 and depressed vanes 27 alternately in the surface of the outer ring 23 by striking the vanes from the rear wall 16. As shown in Figure 8, the depressed or inwardly directed vanes 27 are punched out of the ring 23 with a length sufficient to extend angularly inwardly and be bottomed against the inner ring 22, while the raised or outwardly directed vanes 26 are of considerably shorter length and extend angularly outwardly in generally the same direction as the vanes 27. In effect, each vane 26, the intervening portion of the wall 16 and the contiguous vane 27, affords a deflector or air scoop unit at the end of the opening from which the vane 26 was punched.

Figure 9 illustrates the means for securing the brake drum cooling device within a conventional wheel structure. This wheel structure 30 contains a multi-flange, drop center type tire rim 31 which is connected by riveting, welding, or the like, through the base flange 32 to a central body portion or spider 33. The spider 33 has apertures or air circulation openings 41 for cooling air that has passed over or around surfaces of a brake housing or drum 34.

The spider 33 is secured to the brake housing 34 by means of a series of bolts 35 and their associated attachment nuts 36. The brake housing 34 is provided with an annular arcuate radial rib 37 providing a shoulder retaining engagement by the annular lip 12 of the cooling device.

The construction and outside diameter of the cooling device is such that it may accommodate wheel balancing weights 39 disposed along the periphery and secured to the tire rim 31 by means of strips 40.

The annular lip 17 of the upper ring 23 is held in tight, thrusting frictional engagement against a flange surface of the tire rim 31 by reason of the interengagement of the flange 12 and the drum rib 37 placing the drum cooler ring under assembled tension.

From Figure 9, it will be seen that the cooling ring projects axially inwardly well beyond the tire rim and the bulge of the side wall of a tire supported thereby as the wheel rotates, air passing the inner side of the wheel and tire assembly is caught by the vanes 26 and is directed radially inwardly into the cooler ring, and then, with the assistance of the inner vanes 27, is caused to pass axially from the open side of the ring assembly, across surfaces of the brake housing 34 and out the circulation openings 41 in the spider 33. In this manner, the brake housing is continually positively cooled while the vehicle is in motion.

It will be understood that modifications and variations may be effected without departing from the scope of the novel concepts of the present invention.

I claim as my invention:

1. In a method of manufacturing brake drum air cooling rings and the like, shaping a piece of sheet metal into a differential diameter tube comprising an axially elongated first tubular portion of one diameter and a second tubular portion of substantially larger diameter beyond one end of the first tubular portion and connected thereto by a generally radially extending portion, severing said differential diameter tubular portions from one another along a circular line at said first tubular portion adjacent to said radially extending portion, turning the margin contiguous with said severed edge adjacent to said radially extending portion to assure a smaller internal diameter of the turned margin than the outside diameter of said first portion, relatively reversing the positions of said tubular portions and assembling the second tubular portion coaxially about the first tubular portion with the turned edge of one tubular portion positioned adjacent the severed edge of the other, and securing an end marginal area of the severed edge of said first portion fixedly to said turned margin to unite fixedly the tubular portions concentrically together.

2. In a method of manufacturing brake drum air cooling rings and the like, shaping a piece of sheet metal into a differential diameter tube comprising an axially elongated first tubular portion of one diameter and a second tubular portion of substantially larger diameter beyond one end of the first tubular portion and connected thereto by a generally radially extending portion, severing said differential diameter tubular portions from one another along a circular line at said first tubular portion adjacent to said radially extending portion, turning the margin contiguous with said severed edge adjacent to said radially extending portion to assure a smaller internal diameter of the turned margin than the outside diameter of said first portion, relatively reversing the positions of said tubular portions and assembling the second tubular portion coaxially about the first tubular portion with the turned edge of one tubular portion positioned adjacent the severed edge of the other and securing an end marginal area of the severed edge of said first portion fixedly to said turned margin to unite fixedly the tubular portions concentrically together to provide a tubular space therebetween, and striking a series of outwardly directed vanes and a second series of inwardly directed vanes from one of said tubular portions and providing by such striking out of the vanes openings into said tubular space.

3. In a method of making a sheet metal article, the steps of rolling a strip of sheet metal along longitudinal lines into relatively offset opposite side portions connected by an angularly related flange portion and contemporaneously forming the rolled strip into a helix, severing the helix along predetermined transverse lines into equal sections, connecting the respective opposite ends of each of the sections permanently together to form a ring thereof having the offset portions at respective differential diameters providing a small diameter tubular portion and a substantially larger diameter tubular portion, severing said smaller and larger diameter portions along a circular line adjacent to juncture of the smaller diameter portion with the angular connecting flange, turning the severed edge adjacent said connecting flange to enable free telescoping passage of the turned edge longitudinally about the outside diameter of said smaller diameter portion, relatively reversing the positions of said tubular portions and telescopically disposing said larger diameter portion about the outside diameter of the smaller diameter portion with the turned edge of one tubular portion positioned adjacent the severed edge of the other and fixedly connecting said turned edge to the severed edge of the smaller diameter portion so that said angular connecting flange fixedly retains the larger and smaller diameter portions in concentric spaced relation.

4. The method of claim 3 further characterized by rolling into the strip for a limited distance in that longitudinal area of the ultimately smaller diameter portion contiguous juncture with the angular connecting flange a third offset portion at an elevation intermediate the first mentioned offset portions so that in the ring the third elevation portion provides an intermediate diameter portion, effecting severance along said circular line at juncture of said intermediate diameter portion with the smaller diameter portion, curling said smaller diameter portion into a bead to provide said turned edge, and curling the severed edge of the smaller diameter portion about said turned edge bead in effecting connection of the larger and smaller diameter portions.

References Cited in the file of this patent

UNITED STATES PATENTS

| | | |
|---|---|---|
| 1,881,002 | Udale | Oct. 4, 1932 |
| 1,954,532 | Mahoney | Apr. 10, 1934 |
| 1,990,746 | Nelson | Feb. 12, 1935 |
| 2,089,972 | Lyon | Aug. 17, 1937 |
| 2,099,803 | Eynon | Nov. 23, 1937 |
| 2,190,669 | Lyon | Feb. 20, 1940 |
| 2,264,946 | Lyon | Dec. 2, 1941 |
| 2,312,159 | Gulotta | Feb. 23, 1943 |
| 2,366,224 | Warp | Jan. 2, 1945 |